United States Patent [19]

Tsuji et al.

[11] Patent Number: 4,749,062
[45] Date of Patent: Jun. 7, 1988

[54] DISPLAY CONTROL APPARATUS FOR ELEVATOR

[75] Inventors: Shintaro Tsuji; Yasuhiro Nagata, both of Inazawa, Japan

[73] Assignee: Mitsubishi Denki Kabushiki Kaisha, Japan

[21] Appl. No.: 924,626

[22] Filed: Oct. 29, 1986

[30] Foreign Application Priority Data

| Oct. 30, 1985 | [JP] | Japan | 60-243335 |
| Oct. 30, 1985 | [JP] | Japan | 60-243336 |
| Oct. 30, 1985 | [JP] | Japan | 60-243337 |
| Dec. 16, 1985 | [JP] | Japan | 60-282648 |
| Dec. 16, 1985 | [JP] | Japan | 60-282649 |

[51] Int. Cl.$^4$ .................................... G09G 3/20
[52] U.S. Cl. ............................ 187/139; 340/726
[58] Field of Search .............. 187/130, 139; 340/700, 340/720, 724, 726, 815.01, 815.24; 364/513, 514

[56] References Cited

U.S. PATENT DOCUMENTS

| 4,400,786 | 8/1983 | Mandel et al. | 364/513 |
| 4,400,787 | 8/1983 | Mandel et al. | 364/513 |
| 4,577,177 | 3/1986 | Marubashi | 187/139 |
| 4,660,031 | 4/1987 | Buchas | 340/726 X |

FOREIGN PATENT DOCUMENTS 60-100379 7/1985 Japan .
60-167871 8/1985 Japan .

Primary Examiner—William M. Shoop, Jr.
Assistant Examiner—W. E. Duncanson, Jr.
Attorney, Agent, or Firm—Leydig, Voit & Mayer

[57] ABSTRACT

A display control apparatus for an elevator comprising a clock which delivers time information, memory means to store a plurality of items of greeting information dependent upon times, selection means to select from the memory means the greeting information item corresponding to the current time given by the clock, and synthesis means to deliver the selected greeting information item in combination with general information as display information. When the selection means derives the greeting information corresponding to the current time from the memory means on the basis of the time information of the clock, the synthesis means applies it to a display unit in combination with the general information, whereby appropriate greeting information items are presented to the users of the elevator at proper times.

8 Claims, 15 Drawing Sheets

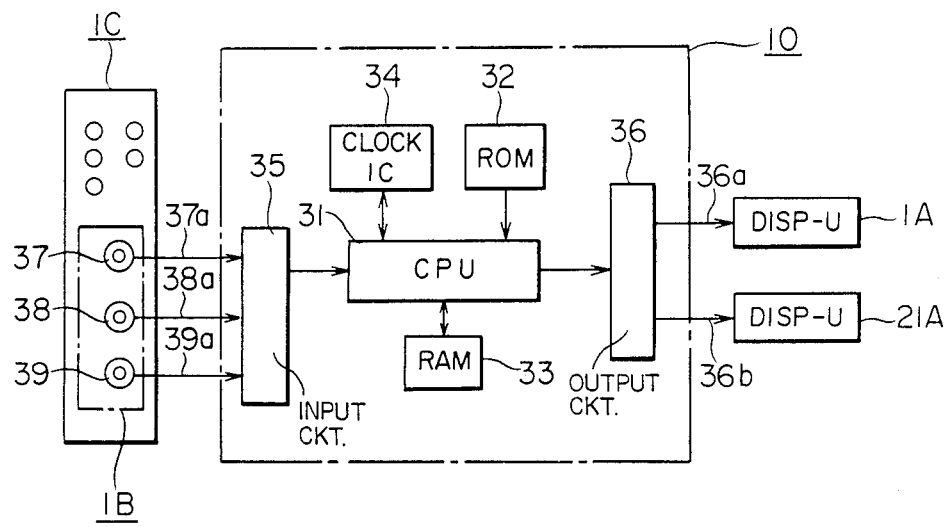

| | 33 |
|---|---|
| S(1) | 00 : 00 |
| S(2) | 06 : 00 |
| ⋮ | ⋮ |
| S(10) | 10 : 00 |
| E(1) | 12 : 00 |
| E(2) | 15 : 00 |
| ⋮ | ⋮ |
| E(10) | 14 : 00 |
| M(1) | GOOD MORNING. |
| M(2) | IT IS FINE TODAY. |
| ⋮ | ⋮ |
| M(10) | TEMP. = 20°C. |
| D | GOOD MORNING. # IT IS FINE TODAY. # TEMP. = 20°C. |
| i | 1 |
| t | 11 : 00 |

G. # IT IS FINE TODA — 1A

← SCRL DIR

FIG. 20
| | 33 |
|---|---|
| S(1) | 00 : 00 |
| S(2) | 06 : 00 |
| ⋮ | ⋮ |
| S(10) | 10 : 00 |
| E(1) | 12 : 00 |
| E(2) | 15 : 00 |
| ⋮ | ⋮ |
| E(10) | 14 : 00 |
| M(1) | GOOD MORNING. |
| M(2) | IT IS FINE. |
| ⋮ | ⋮ |
| M(10) | TEMP. = 20°C. |
| D | GOOD MORNING.<br># IT IS FINE.<br># TEMP. = 20°C. |
| i | 1 |
| t | 11 : 00 |
| k | 1 |
| L | 44 |
| SP | 150 |
FIG. 21
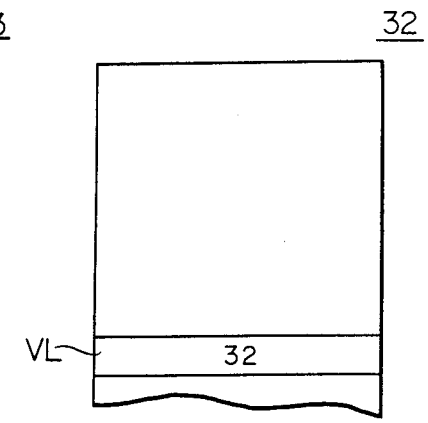
FIG. 22
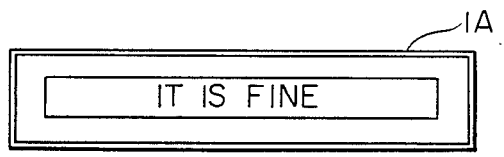
FIG. 23
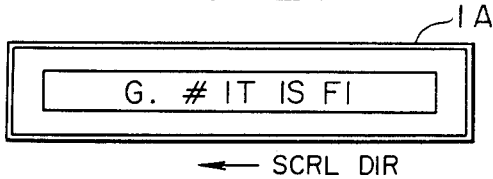
← SCRL DIR

DISPLAY CONTROL APPARATUS FOR ELEVATOR

BACKGROUND OF THE INVENTION

This invention relates to a display control apparatus for an elevator in which the information of, for example, time and a weather forecast is displayed on a display unit disposed in at least either of a cage and a hall.

The period of time during which the passengers of an elevator are waiting for the arrival of a cage in an elevator hall or the period of time during which they are getting on the cage is essentially a wasteful time. In order to utilize the time more effectively various items of information, for example, a weather forecast, a piece of news, a show guide and a conference guide, are displayed. A conventional display device employs a liquid crystal, fluorescent display tubes, a Braun tube, light emitting diodes or the like and is disposed in the elevator hall or the cage to display the information items in shapes of letters and patterns.

Another prior art display apparatus for an elevator is disclosed in Japanese Utility Model Registration Application Laid-open No. 60-100379. This apparatus displays on a display device, such as a cathode-ray tube (CRT), a cage position, a running direction, a next stopping floor, etc., based on time and the operating information of the elevator.

Further, there has been put into practical use an apparatus wherein time and other guidance information are displayed on a simple display device which can display only a specific number of characters at the same time.

In any of the apparatuses in which the time (hour, minutes and seconds) is displayed on the display device, a clock for delivering the time information to the display device is required, and also an adjusting device having switches is needed in order to adjust the clock.

Furthermore, it is necessary to distinctly perform "hour," the "minutes," and the "seconds."

On the other hand, observation information items such as weather and temperature or information items concerning the market trends of the price index of stocks, the rate of exchange, etc. fluctuate with the time. In displaying such information items on the display device, the functions of setting these varying portions are performed in addition to the time adjustments of the clock.

The switches for performing such functions are often disposed in the machinery room of the elevator, the cage, the hall or the caretaker's room for occasional updates. In addition, some contents of the information should preferably be displayed at fixed times requiring considerable labor.

The prior-art display control apparatus for the elevator as stated above requires the switch for informing the clock side of the start of the adjustment of the time of the clock, and the switches for setting the "hour," "minutes" and "seconds" respectively. In the case where the information items concerning the time as output from the clock and the information items including the elements fluctuating with the lapse of time, such as weather information and financial market information, are displayed on the display unit, a large number of adjusting switches are required.

Accordingly, there is the problem that the selection of a place for mounting the large number of switches thereon is difficult or the problem in design that the attachment of a large-sized switch box spoils the outward appearance of the apparatus.

In addition, the display device in the prior art is constructed so as to present the scroll display irrespective of the number of characters which ought to be displayed. This leads to the problem that, when the number of characters of the information to be displayed is smaller than the number of characters which the display device can simultaneously display, the content of the information is difficult to read in spite of the capability of the simultaneous display. A further problem is that, when the number of characters of the information to be displayed becomes large, the users cannot read the whole information in the period of time during which they are getting on the cage of the elevator or waiting in the hall.

Besides, when the number of information items to be displayed becomes large, the situation in which a plurality of information items must be simultaneously displayed will arise. Heretofore, in such a case, only one information item to be displayed has been selected according to a predetermined priority level and then displayed. This operation of display, however, incurs the problem that the information required by the users cannot be sufficiently offered.

SUMMARY OF THE INVENTION

This invention has been made in order to solve the problems as described above, and has for its object to provide a display control apparatus for an elevator in which an appropriate display can be presented to the users of the elevator at a proper time, thereby to relieve the sense of irritation, the sense of oppression or the sense of tediousness of the users.

An embodiment of the display control apparatus for an elevator according to this invention comprises a clock which delivers time information, memory means to store a plurality of items of greeting information dependent upon times, selection means to select from said memory means the greeting information item corresponding to the current time afforded by said clock, and synthesis means to deliver the selected greeting information item in combination with general information as display information. When the selection means derives the greeting information corresponding to the current time from the memory means on the basis of the time information of the clock, the synthesis means applies it to a display unit in combination with the general information, whereby the appropriate greeting information is displayed on the display unit.

Further, this invention has for its object to provide a display control apparatus for an elevator which can remarkable reduce the number of adjusting switches.

An embodiment of the display control apparatus for an elevator according to this invention comprises a clock which delivers time information, a plurality of adjusting switches which include an adjustment start switch that is operated when said clock is adjusted, and time setting means to set "hour" and "minutes" of said clock in response to operations of said adjusting switches and to correct "seconds" upon sensing reset of said adjustment start switch. After the time setting means has adjusted the "hour" and "minutes" of the clock in response to the operations of the adjusting switches, this time setting means itself senses the reset of the adjustment start switch and corrects the "seconds," whereby a switch for correcting "seconds" is dispensed with.

Another embodiment of the display control apparatus for an elevator according to this invention comprises adjusting switches which are shared by the time adjustment of the clock for setting first information and by setting of contents of fluctuant elements of second information when the first information concerning the time as delivered from said clock and the second information including the elements fluctuating with the lapse of time are to be displayed. Thus, the time adjustment of the clock for setting the first information and the setting of the contents of the fluctuant elements of the second information fluctuating with the lapse of time are carried out with one set of adjusting switches, whereby the number of switches is reduced.

Still further, this invention has for its object to provide a display control apparatus for an elevator in which, even when it has become necessary to display at the same time a plurality of items of information pre-engaged separately, all the information items required by the users of the elevator can be displayed on a display device.

An embodiment of the display control apparatus for an elevator according to this invention consists in a display control apparatus wherein when a pre-engaged time zone has been reached, display information previously registered is selected and is displayed on a display unit disposed in a cage or hall of the elevator, characterized by a construction in which when it has been detected that a plurality of items of information separately pre-engaged must be displayed in the same time zone, the plurality of information items are joined together in a predetermined order by synthesis means so as to generate display information anew, whereupon this display information is scroll-displayed on said display unit.

Yet further, this invention has for its object to provide a display control apparatus for an elevator which can be switched into a display form suited to the number of characters of the information selected for the display as described above.

An embodiment of the display control apparatus for an elevator according to his invention consists in a display control apparatus wherein when a predetermined condition has been met, information corresponding thereto is selected and is displayed on a display unit disposed in a cage or hall of the elevator, characterized by a construction in which a number of characters of the information selected for the display is detected by detection means, and the detached number of characters and a prescribed value are compared by display switching means so as to switch forms of the display on said display unit on the basis of a result of the comparison. Thus, the forms of the display of the information on the display unit disposed in the cage or hall of the elevator are switched in accordance with the number of characters of the information selected for the display.

BRIEF DESCRIPTION OF THE DRAWINGS

FIG. 2 is a system block diagram of the embodiment,

FIG. 3 is a diagram showing the content of a ROM which is the constituent of the embodiment.

FIG. 20 is an exemplary diagram showing information set in a RAM, FIG. 21 is an exemplary diagram showing information set in a ROM, and FIGS. 22 and 23 are exemplary diagrams each elucidating the display content of a display unit.

PREFERRED EMBODIMENTS OF THE INVENTION

Now, an embodiment of this invention will be described with reference to FIGS. 1 thru 10.

Figure 1:
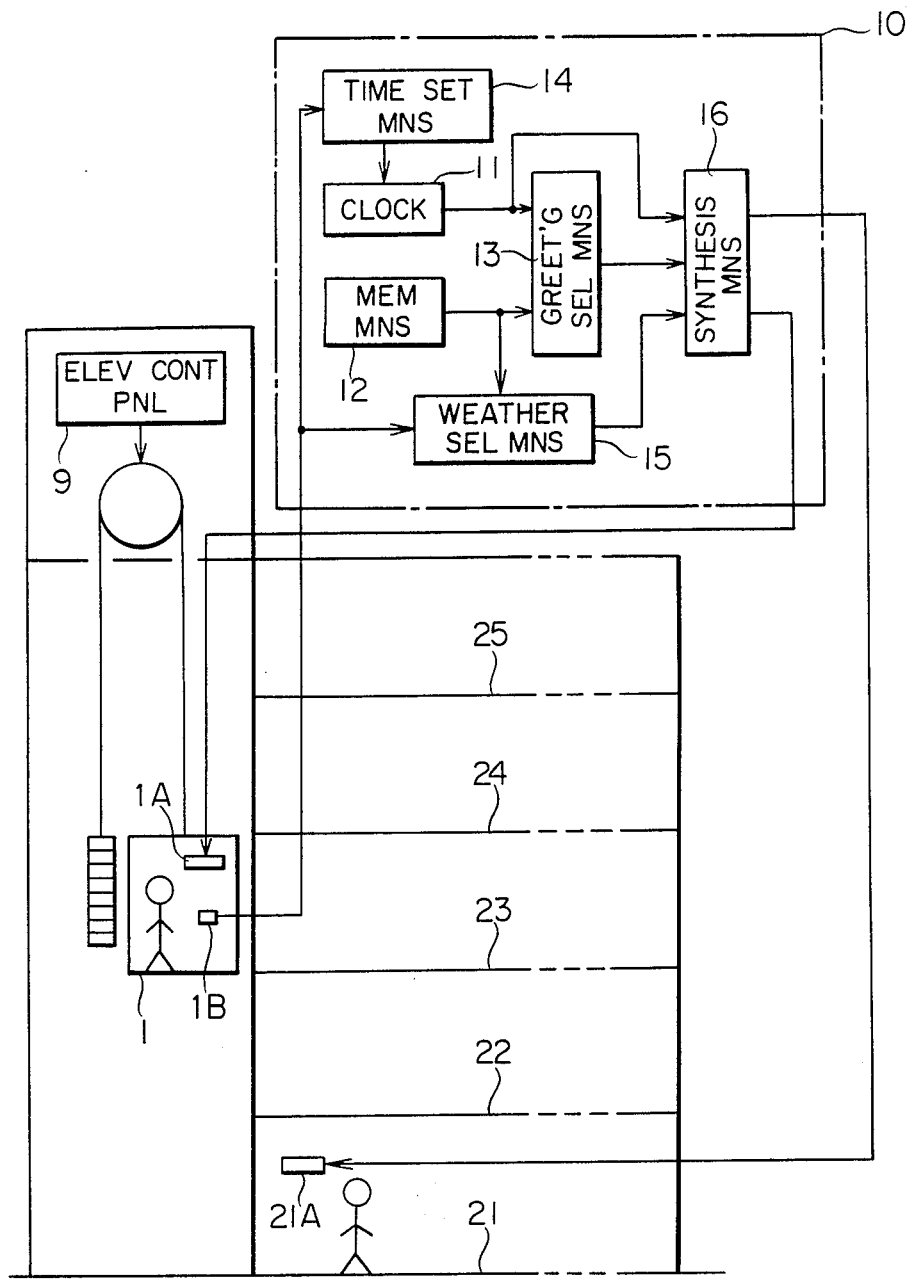
FIG. 1 is a general block diagram of an embodiment of this invention.

FIG. 1 is a general block diagram of this embodiment. It is assumed that an elevator be installed in a five-story building. Numeral 1 designates a cage having liquid crystal display unit 1A capable of displaying any desired sentence and adjusting switches 1B for adjusting the time of a clock and for selecting the content of a weather forecast to be displayed on the display unit 1A. Numeral 9 designates an elevator control panel for controlling the operation of the cage 1 to all floors of the building. A control device 10 is disposed in the cage 1, and supplies the display unit 1A and another display unit 21A with information to be displayed. The display unit 21A is disposed in the elevator hall 21 of the first floor, and is made of a liquid crystal display likewise to the display unit 1A in the cage 1. Shown at numerals 21–25 are the elevator halls of the first–fifth floors, respectively.

Among the aforementioned constituents, the control device 10 includes a clock 11 which delivers time information (hour, minutes and seconds) for displaying a current time, memory means 12 storing a plurality of greeting information items and information items pertaining to different forecasts, greeting selection means 13 to select from the memory means 12 a greeting information item corresponding to the current time, time setting means 14 to adjust the time of the clock 11 through the adjusting switches 1B, weather selection means 15 to select a weather forecast information item corresponding to the weather forecast at the current time, and synthesis means 16 to generate display information to the display unit 1A in the cage 1 and the display unit 21A in the hall 21 of the first floor by combining the weather forecast information item selected by the weather selection means 15, with the greeting information item selected by the greeting selection means 13, and the current time information.

FIG. 2 is a system block diagram of this embodiment. Referring to the figure, the control device 10 is formed of a microcomputer having a CPU 31, a ROM 32, a RAM 33, a clock IC 34, an input circuit 35 and an output circuit 36. The adjusting switches 1B which is connected to the input circuit 35 are disposed in the slide cover (not shown) of a cage operation panel 1C. Here, the adjusting switches 1B include an adjustment start switch 37 which is closed (hereinbelow, the closure shall be termed 'on') when setting the time of the clock IC 34 or when setting the weather forecast and is opened (hereinbelow, the opening shall be termed 'off') when predetermined adjustments have ended, and which delivers an under-adjustment signal 37a that becomes "H" (a high level) while this switch is 'on', a mode switch 38 with which any of the "hour" and "minutes" of the clock and "weather" to be set is selected at will and which delivers a mode signal 38a indicative of a value 1, 2 or 3 representative of "hour", "minute", and "weather", respectively, and a count switch 39 which is disposed for selecting the content to-be-set selected with the mode switch 38 and which delivers an update signal 39a of "H" while this switch is 'on'. On the other hand, the display units 1A and 21A are connected to the output circuit 36 and are respectively supplied with display information signals 36a and 36b from this output circuit 36.

Next, FIG. 3 is a diagram which indicates the plurality of greeting and contents of weather information items stored in the ROM 32. Here are stored coded greeting data G1–G3 which express "GOOD MORNING", "GOOD AFTERNOON" and "GOOD EVENING" respectively, display start time data S1–S3 which set the display start times "00:00," "12:00" and "17:00" of the respective greeting data, coded data K(1)–K(3) which express "FINE," "CLOUDY" and "RAINY" respectively, and coded data H1, E1, H2 and E2 which express parts of sentences to be used when the weather forecast is displayed: "IT IS," "TODAY," "IT WILL BE" and "TOMORROW" respectively.

The operation of this embodiment will be described with reference to flow charts of FIGS. 4 thru 8. The operations indicated in the flow charts are executed by calculation programs which are stored in the ROM 32.

Figure 4:
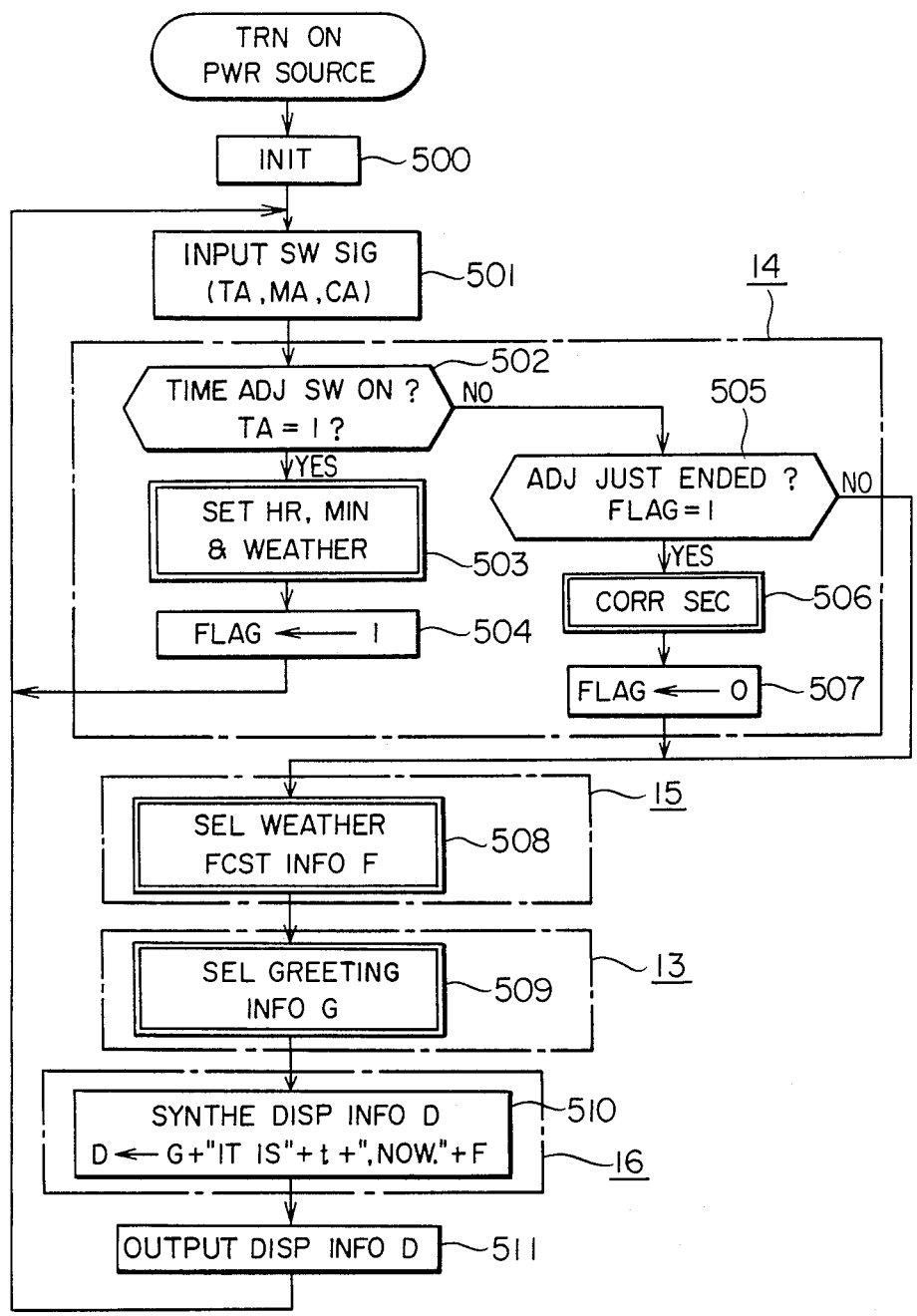
FIGS. 4 thru 8 are flow charts each elucidating the operation of the embodiment.

As shown in FIG. 4, when a power source is first turned 'on,' a step 500 initializes the apparatus to set data in the RAM 33 to '0' or any other value, to reset the clock IC 34, and so forth. After this process has ended, the processes of steps 501–511 are repeatedly executed.

At the step 501, the under-adjustment signal 37a, mode signal 38a and update signal 39a are input from the adjusting switches 1B through the input circuit 35 so as to set under-adjustment data TA (TA="1" is set when the under-adjustment signal 37a is "H"), mode data MA and update data CA in the RAM 33 respectively. The next step 502 decides whether or not the time of the clock IC 34 or the weather content is being adjusted with the adjusting switches 1B. If the time or the weather content is being adjusted by a person in charge on this occasion, the under-adjustment data item TA is "1". Therefore, the control flow proceeds to the step 503, at which the "hour" as well as "minutes" of the clock IC 34 or the "weather" of the weather forecast is set. At the subsequent step 504, a flag FLAG for detecting the end of the setting is set to "1". Then, the control flow returns to the step 501 again. That is, while the time adjustment of the clock IC 34 is being made or the "weather" of the weather forecast is being set by the use of the adjusting switches 1B, the processes of the steps 505–511 are not carried out.

Figure 5:
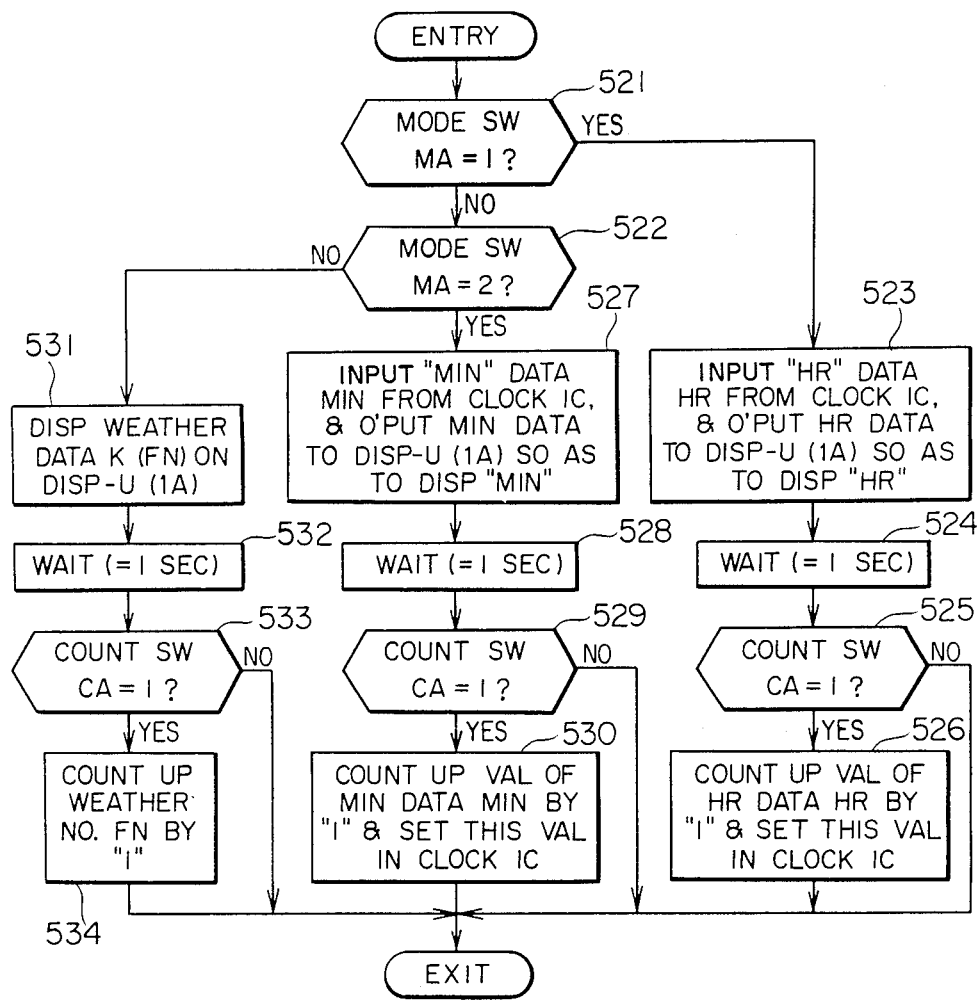

Here, the setting of "hour" as well as "minutes" and "weather" at the step 503 will be described in detail with reference to FIG. 5.

Assuming that the mode data MA be "1" owing to the manipulation of the mode switch 38, a step 521 is followed by a step 523 in accordance with the decision of the former. At the step 523, a signal expressive of "hour" is input from the clock IC 34 and is set as hour data HOUR. In addition, the value of the hour data HOUR is output to the display unit LA in the cage 1 so as to display "hour" in the cage. After a wait of about 1 second at a step 524, the control flow proceeds to a step 525. While watching the displayed value of "hour", the person in charge manipulates the count switch 39. If the count switch 39 is turned 'on', the update data CA is set to "1". Therefore, the control flow proceeds to a step 526, at which the hour data item HOUR is counted up by "1" and the value is set in the clock IC 34. In this case, when the value of the hour data HOUR has become "24", the hour data item is set to "0". Thus, the displayed value is put forward by 1 hour. In contrast, when the count switch 39 is turned 'off', the process of the step 526 is not executed, and hence, the value of "hour" displayed on the cage display unit 1A then becomes the newest value set in the clock IC 34. Accordingly, the person in charge may turn 'off' the count switch 39 upon acknowledging that the value to be set has been displayed on the display unit 1A in the cage 1 by manipulating the count switch 39. Next, in a case where the mode data item MA is "2", "minutes" is set likewise to the setting of "hour" by the processes of steps 527–530. Likewise, in a case where the mode data item MA is "3", the control flow proceeds from a step 522 to a step 531, at which the display unit 1A in the cage 1 is supplied with weather data K(FN) so as to display the weather data currently selected. FN denotes the number corresponding to the weather; "1" represents "FINE", "2" represents "CLOUDY" and "3" to represents "RAINY". If, after the subsequent wait at a step 532, the update data item CA is "1" at a step 533, the weather number FN is counted up by "1" at a step 534. When the weather number FN exceeds "3" at this time, it is reset to "1". Accordingly, also in setting the weather, the count switch 39 may be turned 'off' when the weather to be set has been displayed on the display unit 1A in the cage 1, as in the setting of the time.

Next, when the time adjustment of the clock IC 34 or the setting of the "weather" of the weather forecast by the use of the adjusting switches 1B is over and the adjustment start switch 37 is turned 'off', the under-adjustment data item TA is "0" at the step 502 in FIG. 4, and hence, the control flow proceeds to the process of the step 505. At the step 504, whether or not the time adjustment of the clock IC 34 has just ended is decided, and the flag FLAG is set to "1" if the time adjustment has just ended. Therefore, whether or not the flag FLAG is "1" is decided at the step 505, and subject to "1", the correction of seconds or the correction of ±30 seconds to be explained below are made at the step 506. Further, the flag FLAG is reset to "0" at the next step 507.

Figure 6:
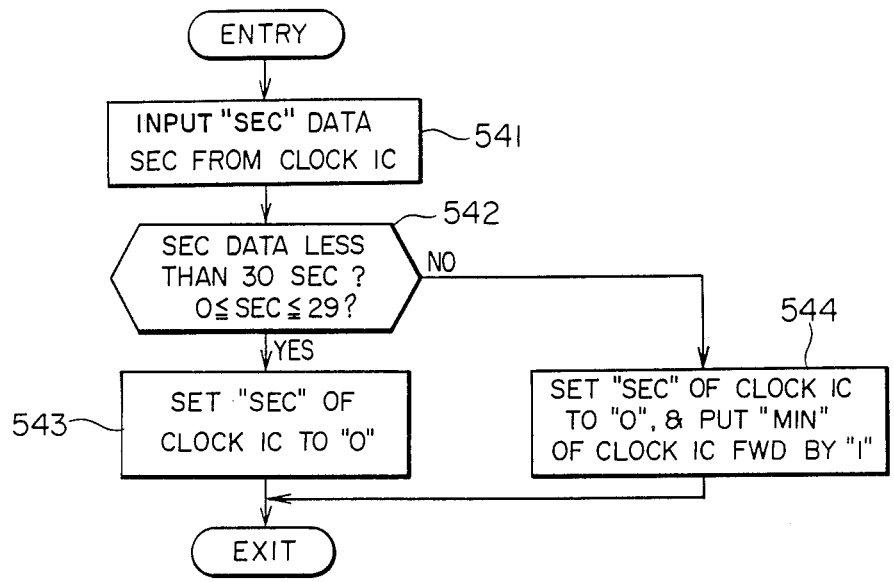

Here, the correction of seconds at the step 506 will be described in detail with reference to FIG. 6.

At a step 541, a signal expressive of "seconds" is input from the clock IC 34 and is set as second data SEC. When the value of the second data SEC is 0–29 seconds(s), the control flow proceeds from a step 542 to a step 543, at which the "seconds" of the clock IC 34 is set to "0". When the value of the second data SEC is 30-59 seconds, the control flow proceeds from the step 542 to a step 544, at which the "seconds" of the clock IC 34 is set to "0" and also the "minutes" is counted up by one. In this way, the second correction is made.

Next, when the second correction stated above has ended, or when the step 505 has decided that the time adjustment of the clock IC 34 has not just ended, in other words, the flag FLAG is "0", the control flow proceeds to the step 508 at which the weather forecast information F is selected.

Figure 7:
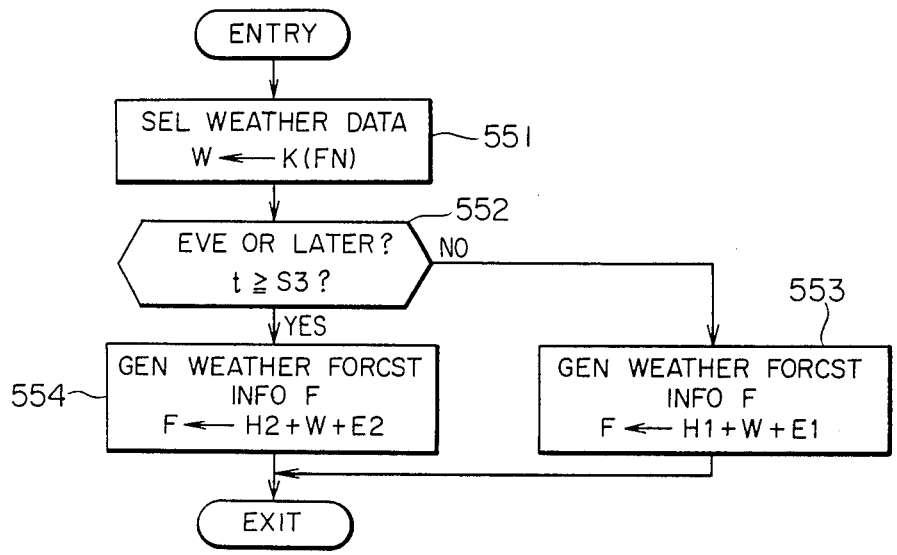

Here, the selection of the weather forecast information at the step 508 will be described in detail with reference to FIG. 7.

At a step 551, on the basis of the weather No. FN set at the step 503, the weather data item K(FN) is selected from the ROM 32 so as to set the weather data W. At a step 552, whether or not it is evening or later (17:00 or later) is decided according to the current time T (hour and minutes) input from the clock IC 34. If the current time T is earlier than the display start time S3 (17:00), the weather forecast information F for today is generated at a step 553 by combining the selected weather data W with the data items H1 (IT IS) and E1 (TODAY.) which are parts of the weather forecast information. On the other hand, if the current time t is the display start time S3 (17:00) or later, the weather forecast information F for tomorrow is generated at a step 554 by combining the selected weather data W with the weather data items H2 (IT WILL BE) and E2 (TOMORROW.) which are parts of the weather forecast information.

When the weather forecast information F has been generated by the step 508 in this way, the greeting information G corresponding to the time is selected at the next step 509 from among the plurality of items of greeting data G1-G3 which are stored in the ROM 32 in dependence on the current times t.

Figures 8, 9, 10:
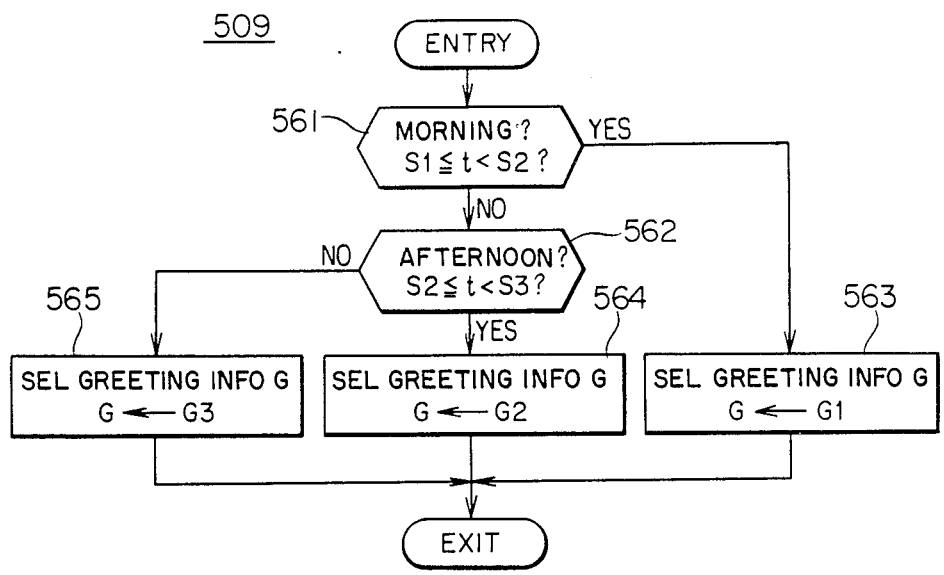
FIGS. 9 and 10 are diagrams each showing the display content of a display unit which is the constituent of the embodiment.

The selection of the greeting information G will be described in detail with reference to FIG. 8. Assuming by way of example that the current time t be 7:15 at a step 561, this step 561 is followed by a step 563, at which the greeting data item G1 (GOOD MORNING) is selected and is set as the greeting information G. Besides, when the current time t has become 12:00, the control flow proceeds from the step 561 via a step 562 to a step 564 this time, and the greeting data item G2 (GOOD AFTERNOON) is selected. Further, when the current time t has become 17:00, the control flow proceeds from the step 561 via the step 562 to a step 565, and the greeting data item G3 (GOOD EVENING) is selected. Thereafter, when the current time t has become 00:00, the greeting data item G1 (GOOD MORNING) is selected again.

When, in this manner, the weather forecast information F has been generated at the step 508 and the greeting information G corresponding to the current time t has been selected at the step 509, the next step 510 combines the greeting information G, current time t and weather forecast information F so as to generate the display information D.

As a result, by way of example, in a case where the current time t is 9:15 and where the setting of the weather is "FINE," the display information D becomes "GOOD MORNING IT IS 9:15, NOW. IT IS FINE, TODAY." The display information D for the current time t of 12:00 becomes "GOOD AFTERNOON IT IS 12:00, NOW. IT IS FINE, TODAY." Further, the display information D for the current time t of 17:00 becomes "GOOD EVENING IT IS 17:00, NOW. IT WILL BE CLOUDY, TOMORROW." On these occasions, the display information D is coded so that it can be displayed on the display units 1A and 21A.

Subsequently, at the step 511, the display information D generated as stated above is output successively letter by letter as the display information signals 36a and 36b through the output circuit 36. Accordingly, the display shown in FIG. 9 or FIG. 10 is presented on the display unit 1A in the cage 1 in accordance with the time, and the same display is presented on the display unit 21A in the hall of the first floor.

Incidentally, the processes of the steps 502-507 explained in conjunction with the flow charts correspond to the time setting means 14 shown in FIG. 1. Similarly, the processes of the steps 508, 509 and 510 correspond respectively to the weather selection means 15, greeting selection means 13 and synthesis means 16 shown in FIG. 1.

Thus, according to this embodiment, as described in relation to the time setting means 14, the correction of the "seconds" of the clock IC 34 is made in conformity with the program of the ROM 32 in synchronism with the point of time at which the adjustment start switch 37 has changed from the 'on' state into the 'off' state, that is, the point of time at which the time adjustment of the clock IC 34 for "hour" and "minutes" has ended. Therefore, a switch for correcting "seconds" need not be disposed among the adjusting switches 1B, and the number of switches can be reduced to that extent. It is simultaneously possible to attain a simplified arrangement and a facilitated manipulation.

Besides, in this embodiment, one set of switches consisting of the adjustment start switch 37 which is held in the 'on' state during the adjustments, the mode switch 38 which selects the object to-be-set and the count switch 39 which selects the content of the object to-be-set function for both the selection of the time adjustment and the selection of the weather forecast. Therefore, the number of switches can be reduced still more as compared with that in the case of disposing switches dedicated to the respective selected modes.

Furthermore, according to this embodiment, the weather forecast of today and that of tomorrow are properly switched and displayed by the program of the ROM 32 in accordance with the current time, so that a switch and the person-in-charge's manipulation therefore are dispensed with.

In addition, in this embodiment, the current time and the weather forecast are displayed in combination on the display units 1A and 21A, while the greeting information corresponding to the time is displayed. Since, in this case, the greeting is automatically selected and displayed, the person-in-charge's labor and switches for altering the contents of the greeting can be omitted.

In the embodiment, the liquid crystal displays have been employed as the display units 1A and 21A. However, even when they are replaced with fluorescent display tubes, cathode-ray tubes (CRTs), light emitting diodes, or the likes, a display operation similar to the foregoing is possible.

Also in the embodiment, various items of information have been displayed with numerals and the alphabet. However, patterns may well be employed conjointly with the letters.

Besides, in the embodiment, the dedicated adjusting switches have been disposed to the cage in order to adjust the clock. Alternatively, by way of example, the time adjustments can be made with the destination buttons of the cage operation panel, or the display control apparatus can be remote-controlled in the caretaker's room.

Although in the embodiment both the adjusting switches and the control device have been disposed in the cage, they may well be disposed in the hall.

Further, although in the embodiment the display units have been disposed in both the cage and the hall, it is also effective for obtaining the various items of information that the display unit is disposed in only either of the cage and the hall.

As described above, according to this invention illustrated in FIGS. 1-10, greeting information corresponding to a current time is selected by selection means from memory means storing a plurality of items of greeting information dependent upon times, and the selected greeting information is combined with another display information by synthesis means so as to generate new display information, which is displayed. Therefore, appropriate displays can be presented to the users of the elevator at proper times, whereby the sense of irritation, the sense of oppression and the sense of tediousness of the users can be mitigated.

Next, the second embodiment of this invention will be described with reference to FIGS. 11-15.

Figure 11:
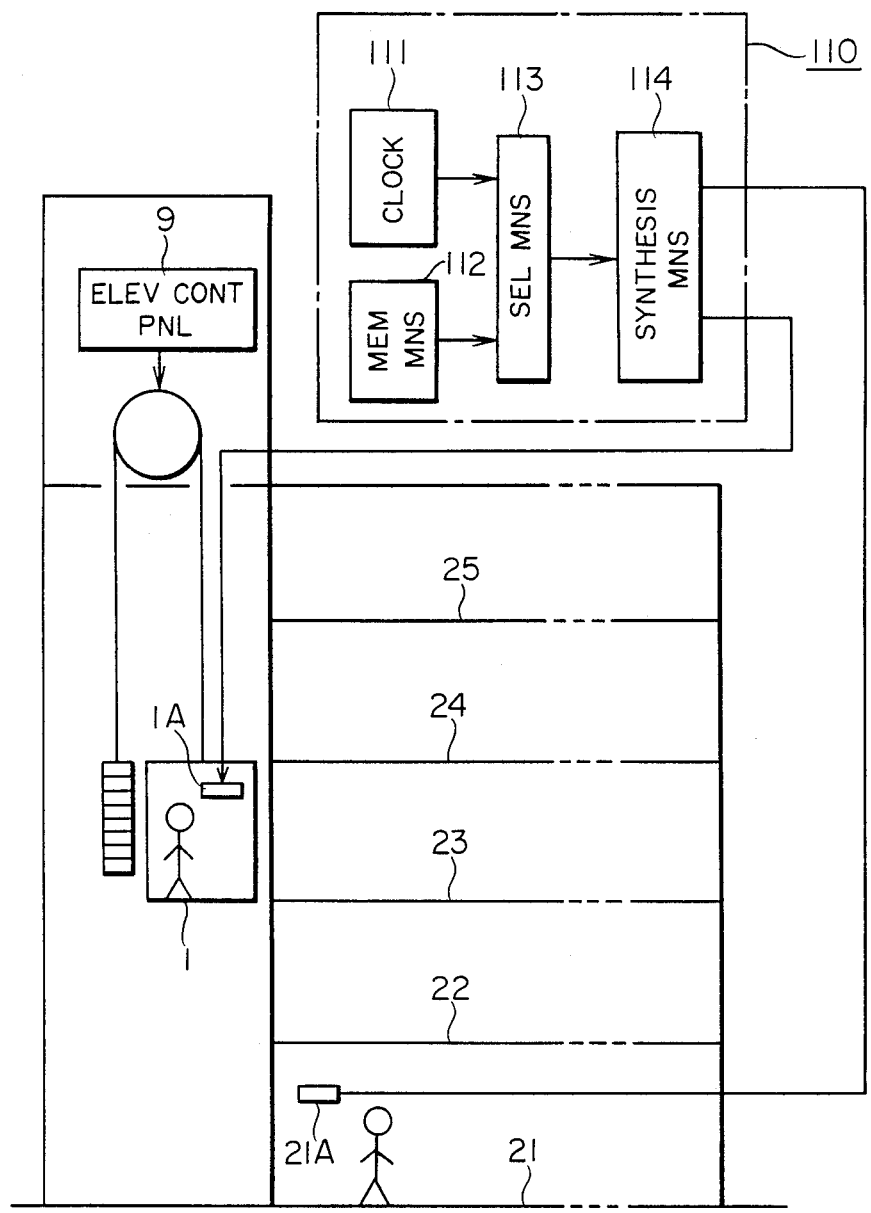
FIG. 11 is a general block diagram showing a second embodiment of this invention.

FIG. 11 is a general arrangement diagram of a display control apparatus for an elevator in the second embodiment of this invention. Portions corresponding to the constituents elucidated in FIG. 1 are assigned the same symbols.

A display control device 110 for the elevator is constructed of a clock 111 which delivers time information (hour and minutes) expressive of a current time, memory means 112 storing a plurality of items of information to be displayed on display units 1A and 21A and periods of time for displaying them (start times and end times), selection means 113 to compare the time information with the display period of time stored in the memory means 112, thereby selecting information to-be-displayed from the memory means 112, and synthesis means 114 operating, upon detecting that the selected display information is composed of a plurality of items, to join the selected display information items together in succession into a single string of display information and to deliver the display information string to the display unit 1A in a cage 1 and the display unit 21A in the hall 21 of the first floor.

Figure 12:
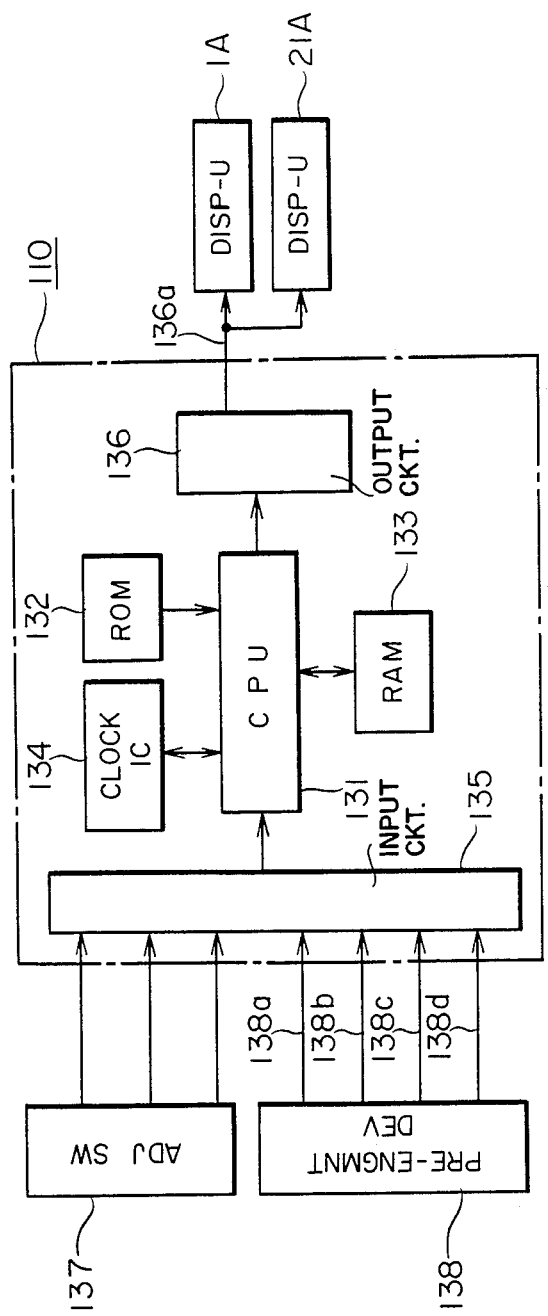
FIG. 12 is a system block diagram of a display control apparatus.

FIG. 12 is a system block diagram of the display control device 110 for the elevator. Referring to the figure, the display control device 110 is formed of a microcomputer which is constructed of a CPU 131, a ROM 132, a RAM 133, a clock IC 134, an input circuit 135 and an output circuit 136. Numeral 137 designates switches which serve to adjust the clock IC 134. Numeral 138 designates a pre-engagement device which serves to pre-engage the contents of information to be displayed (hereinbelow, termed "display messages") and the display periods of time. Symbol 138a denotes a pre-engagement No. signal which expresses the pre-engagement number of the display message, symbols 138b and 138c denote display period signals which express the display start time and the display end time respectively, and symbol 138d denotes a coded display character string signal which expresses the display message. A signal 136a which is delivered from the output circuit 136 is a coded display information signal which expresses the message to be displayed on the display unit 1A in the cage and the hall display unit 21A of the first floor.

Figure 13:
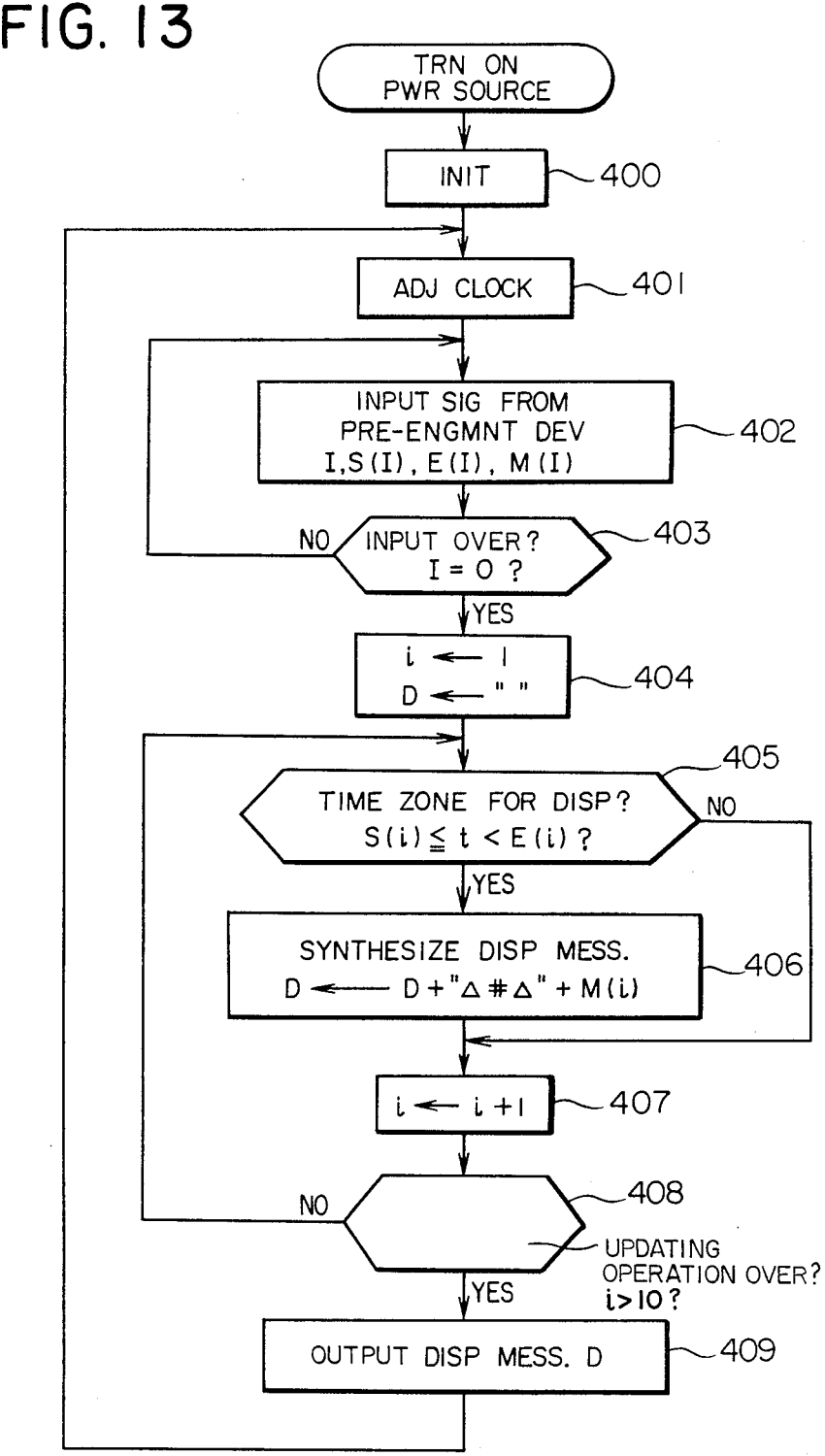
FIG. 13 is a flow chart elucidating the operation of the display control apparatus.

Next, the operations of the display control device 110 for the elevator will be described with reference to a flow chart in FIG. 13. The operations according to this flow chart are executed by a calculation program stored in the ROM 132.

Referring to the figure, when a power source is first turned 'on,' the device is initialized at a step 400. At this step 400 for initialization, data in the RAM 133 is set to a predetermined value such as "0," and the clock IC 134 is reset. After the initializing step 400 has ended, the processes of steps 401-409 are repeatedly executed.

Figures 14, 15:
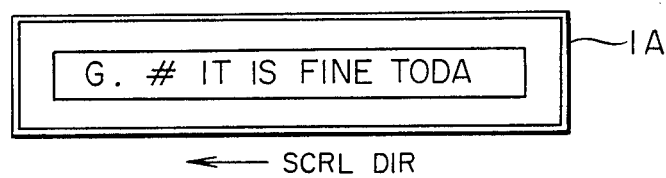
FIG. 14 is an exemplary diagram showing information set in a RAM.
FIG. 15 is an exemplary diagram for explaining the display content of a display unit.

At the step 401, set signals are received from the clock adjusting switches 137 through the input circuit 135, to adjust the clock IC 134 to an appointed time. At the next step 402, a display message M(I) and a display period of time S(I) and E(I) registered by the pre-engagement device 138 are input along with the pre-engagement number I thereof and are set in the RAM 133 as shown in FIG. 14. In this embodiment, the number of the display messages which can be pre-engaged by the pre-engagement device 138 is limited to at most 10, and the length of a display sentence per message is limited toat most 16 characters. When all the pre-engaged display messages and periods have been sent from the pre-engagement device 138 to the display control device 110, the pre-engagement number data item I becomes "0". Therefore, it is detected at the step 403, whereupon the control flow proceeds to the step 404. Before the pre-engagement number data item I becomes "0", the display messages and periods are successively input and set in the RAM 133 at the step 402.

At the steps 404-408, the message to be displayed on the display units 1A and 21A from this time forth is selected and synthesized. At the step 404, a numerical value variable i expressive of the pre-engagement number is initialized to "1", and a character variable D expressive of a synthesized display message (hereinafter, called "synthetic display message") is initialized to a character string of length "0" (=null string). The step 405 decides whether or not it is a time zone for displaying the display message M(i) of pre-engagement number i. If the time t input from the clock IC 134 falls within the display period, $S(i) \leq t < E(i)$ holds. Therefore, the step 405 is followed by the step 406, at which the display message M(i) is further joined to the synthetic display message D already registered, to update the synthetic display message D. On this occasion, a character string "$\Delta\#\Delta$" (where $\Delta$ denotes a blank) is inserted before the display message M(i) so as to facilitate grasping the pause of the sentence. At the step 407, the variable i is incremented by "1" for the process of the next preengagement No. i+1. If, at the step 405, the current time t falls outside the display period ($t < S(i)$ or $t \geq E(i)$ holds), the step 405 is directly followed by the step 407, at which the variable i is updated. As stated above, the number of pre-engageable display messages is at most 10. Therefore, when the processes of the steps 404-407 are over for all the pre-engaged display messages, the pre-engagement variable i becomes "11," and the control flow proceeds from the step 408 to the step 409. As a result, by way of example, when the current time is t=11:00, the three messages of "GOOD MORNING." (00:00-12:00), "IT IS FINE TODAY." (06:00-15:00) and "TEMP.=20° C." (10:00-14:00) are synthesized, and the display message D becomes as shown in FIG. 14.

At the step 409, the synthesized display message D as shown in FIG. 14 by way of example is coded so that it can be displayed on the display units 1A and 21A, and the codes are sent to the display units 1A and 21A through the output circuit 136 successively one by one at intervals of 200 msec. On the display units 1A and 21A, the synthetic display message D sent from the display control device 110 is displayed while each character is being scrolled from the right to the left of the display unit every 200 msec as illustrated in FIG. 15 by way of example. When the synthetic display message D has been entirely sent, the control flow returns to the step 401 again, and similar processes are repeated.

In this manner, according to this embodiment, when a plurality of display messages are pre-engaged in an identical time zone, these display messages are joined together and synthesized as a single display message, and the synthesized display message is scrollingly displayed on display units. Therefore, it becomes possible to inform the users of the elevator of the pre-engaged display messages without omission. Moreover, since a symbol for separating the messages is inserted between the two display messages on this occasion, the messages can be made legible.

Although, in the embodiment, a fluorescent display tube displaying 16 characters has been employed as each display unit, the display unit is not restricted thereto. It is also allowed to employ a plasma display, a character or graphic display made of a liquid crystal, LED's or the like, or a CRT.

Besides, the message to be displayed may be composed of patterns in addition to characters.

Further, the method of synthesizing the plurality of messages is not restricted to merely joining them together in the order of pre-engagement numbers as in the embodiment. By way of example, it can be readily realized to divide the contents of the messages into several classes (such as advertisement, news and weather) and to collect the messages and join them in succession in every class.

As described above, according to the invention illustrated in FIGS. 11-15, a display control apparatus for an elevator wherein when a pre-engaged time zone has been reached, display information previously registered is selected and is displayed on a display unit disposed in the cage or hall of the elevator, is so constructed that, upon detecting that a plurality of items of information separately pre-engaged must be displayed in an identical time zone, the plurality of information items are joined together in a predetermined order by synthesis means so as to generate display information anew, whereupon this display information s scrollingly displayed on the display unit. Therefore, the users of the elevator can be informed of the pre-engaged display information without omission and can effectively spend an idle time within the period of time during which they use the elevator.

Next, the third embodiment of this invention will be described with reference to FIGS. 16-23.

Figure 16:
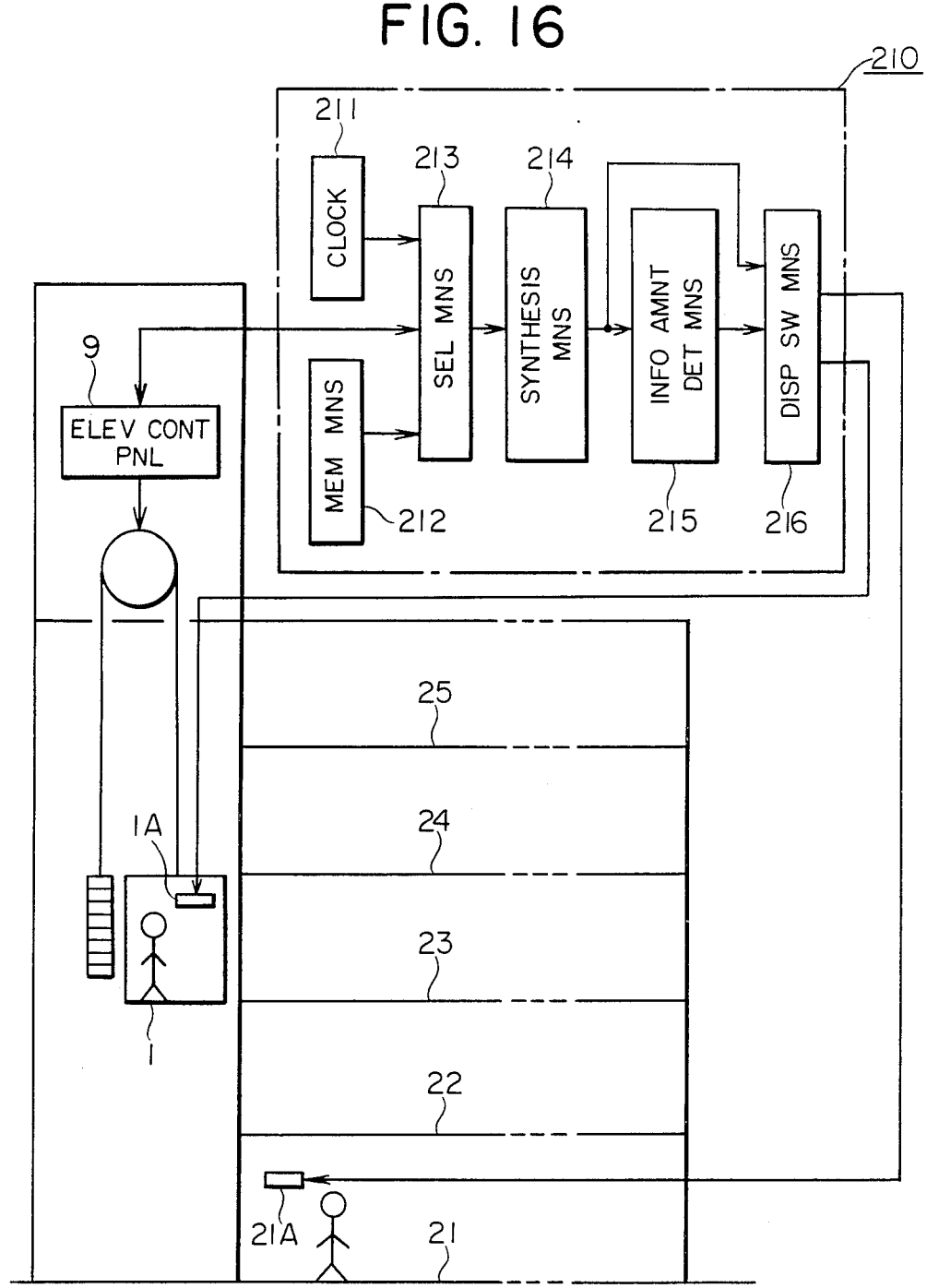
FIG. 16 is a general block diagram showing a third embodiment of this invention.

FIG. 16 is a general arrangement diagram of a display control apparatus for an elevator in the third embodiment of this invention. Portions corresponding to the constituents elucidated in FIG. 1 are assigned the same symbols.

A display control device 210 for the elevator is constructed of a clock 211 which delivers time information (hour and minutes) expressive of a current time, memory means 212 storing a plurality of items of information to be displayed on display units 1A and 21A and periods of time for displaying them (start times and end times), selection means 213 to compare the time information with the display period of time stored in the memory means 212, thereby selecting information to-be-displayed from the memory means 212, synthesis means 214 operating, upon detecting that the selected display information is composed of a plurality of items, to join the selected display information items together in succession into a single string of display information, display information amount detecting means 215 to detect the amount of the synthesized display information (the number of characters), and display switching means 216 to deliver the display information to the display unit 1A in a cage 1 and the display unit 21A in the hall 21 of the first floor and to switch the display form of the display information in accordance with the result of the comparison between the display information amount and a prescribed value.

Figure 17:
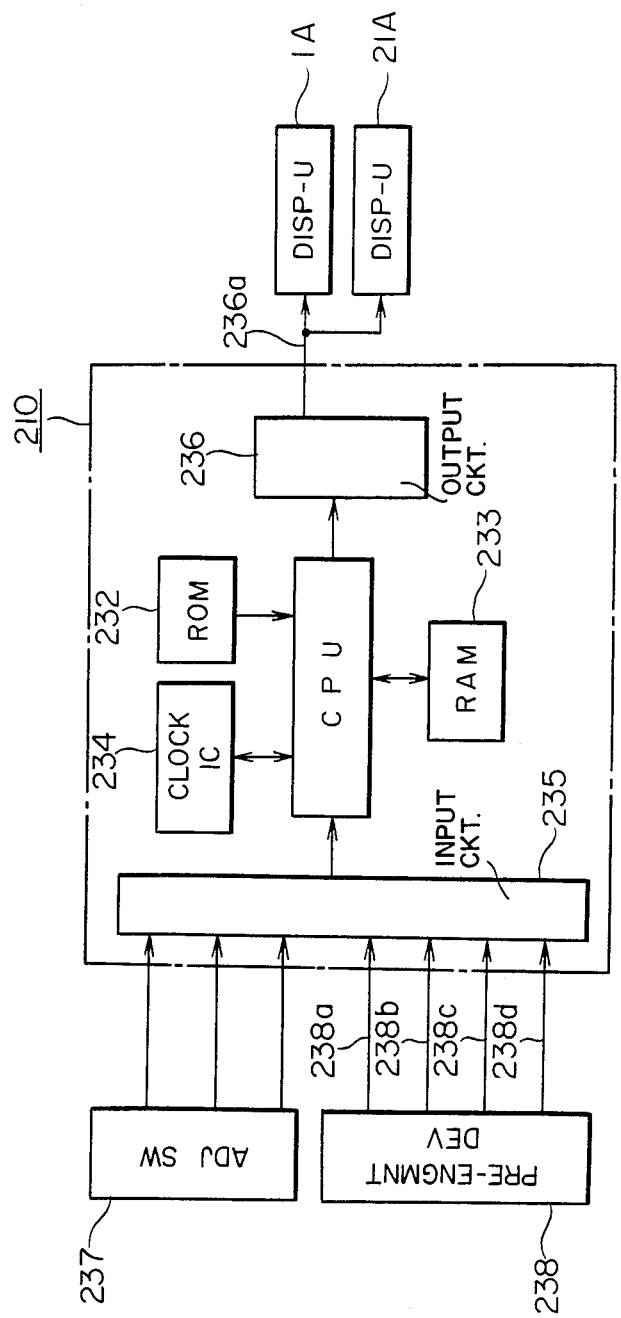
FIG. 17 is a system block diagram of a display control apparatus.

FIG. 17 is a system block diagram of the display control device 210 for the elevator. Referring to the figure, the display control device 210 is formed of a microcomputer which is constructed of a CPU 231, a ROM 232, a RAM 233, a clock IC 234, an input circuit 235 and an output circuit 236. Numeral 237 designates switches which serve to adjust the clock IC 234. Numeral 238 designates a pre-engagement device which serves to pre-engage the contents of information to be displayed (hereinbelow, termed "display messages") and the display periods of time. Symbol 238a denotes a pre-engagement number signal which expresses the pre-engagement number of the display message, symbols 238b and 238c denote display period signals which express the display start time and the display end time respectively, and symbol 238d denotes a codes display character string signal which expresses the display message. A signal 236a which is delivered from the output circuit 236 is a coded display information signal which expresses the message to be displayed on the display unit 1A in the cage and the hall display unit 21A of the first floor.

Figure 18:
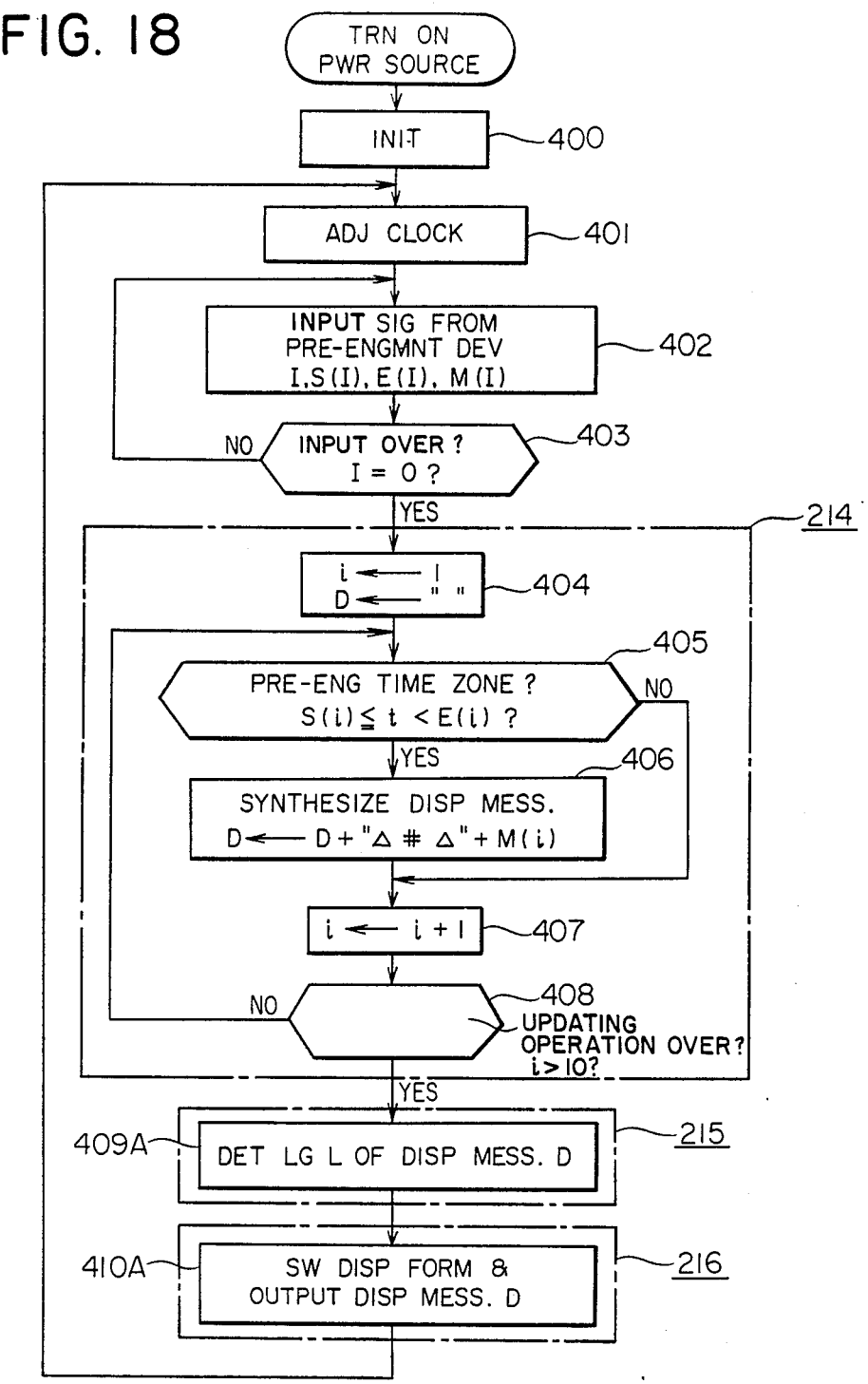
FIGS. 18 and 19 are flow charts each elucidating the operation of the display control apparatus.
Figure 19:
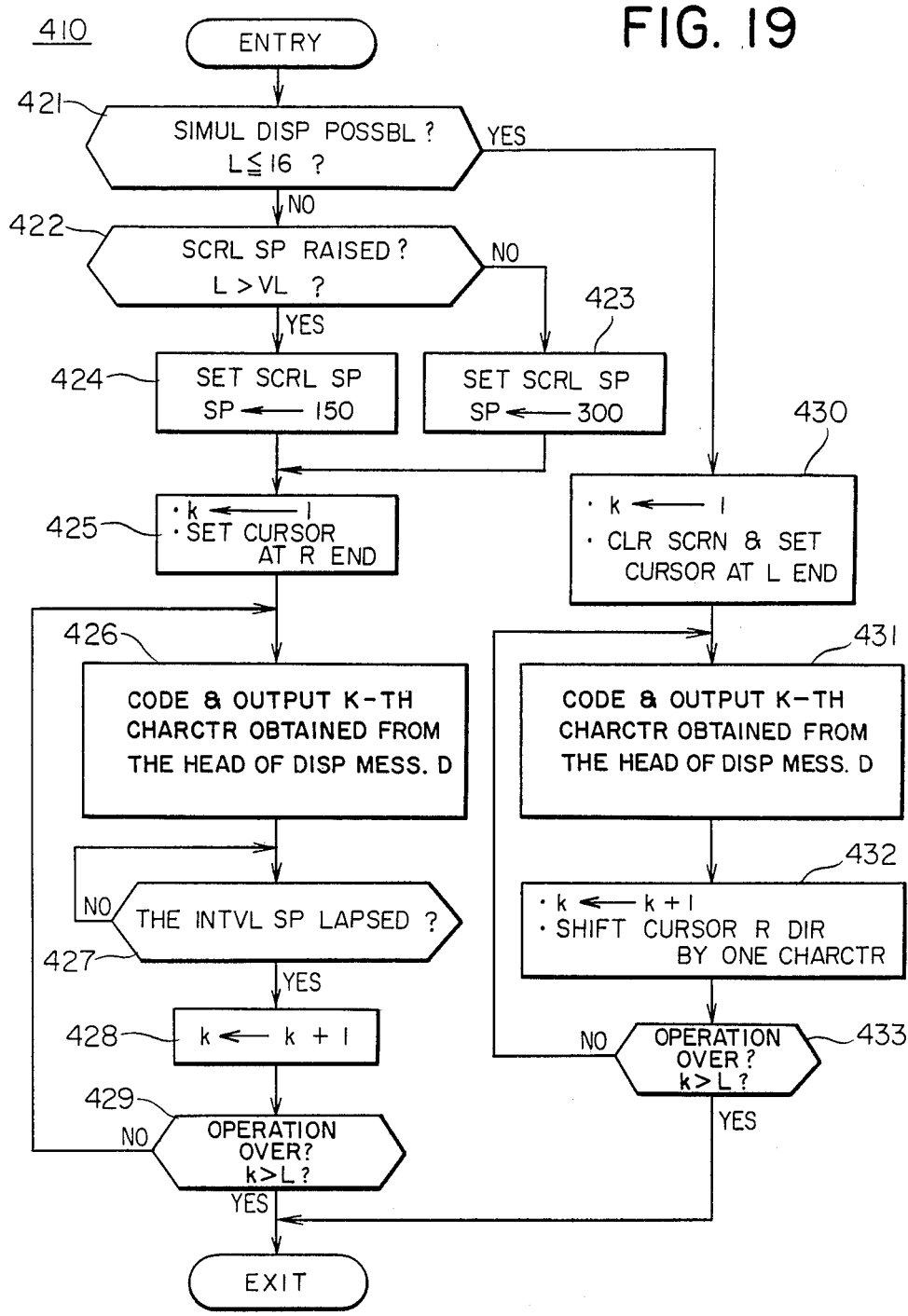

Next, the operations of the display control device 210 for the elevator will be described with reference to flow charts in FIGS. 18 and 19. Since steps 400–408 are the same as those elucidated in FIG. 13, they shall not be repeatedly described.

At a step 409A, the number of characters L of the synthesized display message D is detected. The number of characters L can be readily found by counting the number of the codes of characters which constitute the synthetic display message D.

At the next step 410A, the display form is determined according to the number of characters L, and the synthetic display message D is output to the display units 1A and 21A. This step will be described in detail with reference to the flow chart in FIG. 19.

A step 421 decides if the synthetic display message D can be simultaneously displayed. As stated before, the number of characters which each of the display units 1A and 21A can simultaneously display is at most 16 characters. Assuming t=14:30, the synthetic display message becomes D=IT IS FINE. (the number of characters L=11). Therefore, the number of characters of the synthetic display message D becomes L<16, and the control flow proceeds to a step 430. At the step 430, a variable k which expresses the position of a character to be output in the synthetic display message D is initialized to "1", and the screen of each of the display units 1A and 21A is cleared to set a cursor (indicating a position to be displayed in the screen) at the left end thereof. At a step 431, the k-th character obtained from the head of the synthetic display message D is coded so that it can be displayed by the display units 1A and 21A, and the code is sent to the display units 1A and 21A through the output circuit 236. At a step 432, the variable k is increased by "1", and the cursor of each of the display units 1A and 21A is moved rightwards for one character. A step 433 decides if the synthetic display message D has been entirely output. Until all the characters constituting the synthetic display message D have been output (that is, until the variable k > the number of characters L has been held), the processes of the steps 431–433 are repeated. When they have been output, the processing of the step 410A is ended. Thus, as shown in FIG. 22 by way of example, "IT IS FINE." is simultaneously displayed at the left part of the screen of each of the display units 1A and 21A.

If the current time is t=11:00 at the step 421, the synthetic display message becomes D=GOOD MORNING. # IT IS FINE. # TEMP.=20° C. (the number of letters L=41), and hence, the control flow proceeds to a step 422 this time. The step 422 decides if a scroll speed is raised. In a case where the number of characters L of the synthetic display message D is not greater than a prescribed value VL (which is set to "32" in the ROM 232 beforehand as shown in FIG. 21), a step 423 sets the scroll speed at SP=300 (msec.) as the standard scroll speed per character. On the other hand, in a case where the number of characters L exceeds the prescribed value VL, a step 424 sets the scroll speed at SP=150 (msec.) which is somewhat faster. Thereafter, at steps 425–429, the synthetic display message D is coded so that it can be displayed by the display units 1A and 21A in accordance with the set scroll speed SP, and the codes are sent to the display units 1A and 21A through the output circuit 236 successively one by one at time intervals corresponding to the scroll speed SP. First, at the steps 425, the variable k which expresses the position of a character to be output in the synthetic display message D is initialized to "1", and the cursor of each of the display units 1A and 21A is set at the right end of the screen thereof. At the subsequent step 426, the k-th character obtained from the head of the synthetic display message D is coded so that it can be displayed by the display units 1A and 21A, and the code is sent to the display units 1A and 21A through the output circuit 236. At the step 427, the control flow waits for the lapse of a time interval corresponding to the scroll speed SP and proceeds to the step 428. At the step 428, the variable k is increased by "1". Each of the display units 1A and 21A is adapted to present the scroll display in such a way that, when the coded character signal is input with the cursor located at the right end, a character string being displayed on the screen is shifted leftwards by one character, to discard one character at the left end and to add one input character at the right end. The step 429 decides if the synthetic display message D has been entirely output. Until all the characters constituting the synthetic display message D have been output (that is, until the variable k > the number of characters L is held), the processes of the steps 426–429 are repeated. When they have been output, the processing of the step 410A is ended. Thus, as shown in FIG. 23 by way of example, the synthetic display message D is displayed on the display unit 1A while scrolling one character from the right end toward the left end every time interval corresponding to the scroll speed SP.

In this manner, at the step 410A, the display form is determined depending upon the number of characters L of the synthetic display message D, and this synthetic display message D is output to the display units 1A and 21A.

When the synthetic display message D has been entirely sent, the control flow returns to the step 401 again and repeats similar processing.

Thus, in this embodiment, when the number of characters of information selected for display is not greater than the number of characters which can be simultaneously displayed, the selected information is simultaneously displayed on each display unit, and when the number of characters of the selected information exceeds the number of characters which can be simultaneously displayed, the selected information is scrollingly displayed, so that the users of an elevator are facilitated to read display contents. In addition, a scroll speed in the case where the number of characters of the information selected for display exceeds a prescribed value which is set larger than the number of characters simultaneously displayable is set higher than a scroll speed in the case where the number of characters of the selected information is not greater than the prescribed value, whereupon the selected information is scrollingly displayed, so that the users of the elevator can read a sufficient amount of information in the period of time during which they use the elevator.

Although, in the embodiment, a fluorescent display tube which can simultaneously display at most 16 characters has been employed as the display unit, the display unit is not restricted thereto. Whether the display unit can simultaneously display at most 8 characters or at most 40 characters, this invention is readily applied. It is also allowed to employ a plasma display, a character or graphic display made of a liquid crystal, LED's or the like, or a CRT.

Besides, in the embodiment, the kinds of display characters usable for display messages have been the alphabet, numerals and symbols. However, the kinds of display characters are not restricted thereto, but they may well be Chinese characters and "kana" (the Japanese syllabary). Further, even patterns which can be handled equivalently to characters may be regarded as special characters and handled.

Furthermore, since the embodiment has employed the display unit displaying a single line, a scroll direction has been "from the left to the right." However, the scroll direction is not restricted thereto. With a display unit which can display a plurality of lines, the scroll direction can also be readily made "from the bottom to the top" by way of example.

Furthermore, in the embodiment, the propriety of the scroll display has been decided and the scroll speed has been altered in accordance with the number of display characters, but the aspects of switching display forms are not restricted thereto. By way of example, the scroll speed can be finely divided in three or more stages, and with the display unit capable of displaying a plurality of lines, the scroll directions can be switched for display (between the direction "from the left to the right" and the direction "from the bottom to the "top."

Although the embodiment has been described as to the case of application where information items pre-engaged in terms of times are properly selected and displayed, the method of selecting information to be displayed is not restricted thereto. It is to be understood that the invention is also applicable to, for example, a case of displaying messages conforming to the running states of the elevator (a cage position, a service floor, a next stopping floor, a faulty condition, an emergency operation ascribable to a fire, an earthquake, power failure or the like, and so forth) by the use of signals from the elevator control panel 9.

As described above, according to the invention illustrated in FIGS. 16–23, a display control apparatus for an elevator wherein when a predetermined condition has held, information corresponding thereto is selected and is displayed on a display unit disposed in the cage or hall of the elevator, is so contructed that the number of characters of the information selected for display is detected by detection means, and that the detected number of characters and a prescribed value are compared by display switching means so as to switch the display form of the information on the display unit on the basis of the result of the comparison. Therefore, the users of the elevator are facilitated to read display contents and can read a sufficient amount of information while they use the elevator.

What is claimed is:

1. In an elevator system having a display unit disposed in at least one of elevator cages and a hall; a display control apparatus for controlling display operations of the display unit comprising a clock to deliver time information, memory means to store a plurality of predetermined display information items, selection means including manually adjustable means to select from said memory means a display information item corresponding to the time information of said clock, and synthesis means to combine, in a predetermined manner, the time information delivered by said clock with the corresponding display information item selected by said selection means and to deliver the combined information as synthetic display information to be displayed on the display unit.

2. In an elevator system having a display unit disposed in at least one of elevator cages and a hall; a display control apparatus for controlling display operations of the display unit comprising a clock to deliver time information, memory means to store a plurality of predetermined display information items, selection means including manually adjustable means to select from said memory means a display information item corresponding to the time information of said clock, and synthesis means to combine, in a predetermined manner, the time information delivered by said clock with the corresponding display information item selected by said selection means and to deliver the combined information as synthetic display information to be displayed on the display unit, said selection means including adjusting switches operated for performing time adjustments of said clock to set the time information and for activating said selection means to set contents of varying portions of the display information items.

3. A display control apparatus for an elevator as defined in claim 2 wherein said adjusting switches comprise a first switch actuated when time adjustments of said clock and content setting of the varying portions of the display information items are started and reset when the time adjustments of said clock and the content setting ended, a second switch actuated to select varying portions of the display information items, and a third switch actuated to set the content of the selected varying portion of the display information item.

4. In an elevator system having a display unit disposed in at least one of elevator cages and a hall; a display control apparatus for controlling display operations of the display unit comprising a clock to deliver time information, memory means to store a plurality of predetermined display information items, selection means including manually adjustable means to select from said memory means a display information item corresponding to the time information of said clock, and synthesis means to combine, in a predetermined manner, the time information delivered by said clock with the corresponding display information item selected by said selection means and to deliver the combined information as synthetic display information to be displayed on the display unit, said selection means including a plurality of adjusting switches including an adjustment start switch actuated when time adjustments of said clock are started and reset when the time adjustments are ended, and time setting means to set hour and minute indicating portions of said clock in response to operations of said adjusting switches and to correct a second indicating portion of said clock when said adjustment start switch is reset.

5. A display control apparatus for an elevator as defined in claim 1 wherein said synthesis means operates when the selected information is of a plurality of items, to join the plurality of information items together in a predetermined order and deliver them as the display information, and the display information delivered from said synthesis means is displayed on said display unit in succession.

6. In an elevator system having a display unit disposed in at least one of elevator cages and a hall for simultaneously displaying a limited number of characters not greater than a first prescribed value, memory means to store a plurality of predetermined display information items, and selection means to select from said memory means a display information item for displaying when a predetermined condition has held; a display control apparatus for comprising detection means to detect a number of characters of the selected information item, and display switching means to switch display formats of said display unit in accordance with the detected number of characters.

7. A display control apparatus for an elevator as defined in claim 6 wherein, when the detected number of characters of the information item selected for display is not greater than the first prescribed value, said display switching means is operated to simultaneously display the selected information item on said display unit, whereas, when the number of characters of the selected display information item is greater than the first prescribed value, said display switching means is operated to scrollingly display the selected information item.

8. A display control apparatus for an elevator as defined in claim 7 wherein said display switching means has a second prescribed value set larger than the first prescribed value, and is operated to scrollingly display the selected information item at a scroll speed set higher when the number of characters of the selected information item is greater than the second prescribed value than when the number of characters of the selected information item is not greater than the second prescribed value.

* * * * *